(12) United States Patent
Kim et al.

(10) Patent No.: US 11,938,781 B2
(45) Date of Patent: Mar. 26, 2024

(54) VEHICULAR HEAT MANAGEMENT SYSTEM

(71) Applicant: Hanon Systems, Daejeon (KR)

(72) Inventors: Hyeon Gyu Kim, Daejeon (KR); Doo Hoon Kim, Daejeon (KR); Kyung Ju An, Daejeon (KR); Byeong Ha Lee, Daejeon (KR); Jin Jae Lee, Daejeon (KR); Joong Man Han, Daejeon (KR)

(73) Assignee: Hanon Systems, Daejeon (KR)

(*) Notice: Subject to any disclaimer, the term of this patent is extended or adjusted under 35 U.S.C. 154(b) by 705 days.

(21) Appl. No.: 16/551,870

(22) Filed: Aug. 27, 2019

(65) Prior Publication Data
US 2020/0070619 A1 Mar. 5, 2020

(30) Foreign Application Priority Data

Aug. 29, 2018 (KR) .................. 10-2018-0101750
Aug. 23, 2019 (KR) .................. 10-2019-0103505

(51) Int. Cl.
*B60H 1/00* (2006.01)
*B60H 1/22* (2006.01)

(52) U.S. Cl.
CPC ..... *B60H 1/00278* (2013.01); *B60H 1/00899* (2013.01); *B60H 2001/00121* (2013.01); *B60H 2001/2234* (2013.01)

(58) Field of Classification Search
CPC ............ B60H 1/00278; B60H 1/00899; B60H 2001/00121; B60H 2001/2234
USPC ......................................................... 165/202
See application file for complete search history.

(56) References Cited

U.S. PATENT DOCUMENTS 7,451,808 B2* 11/2008 Busse ................ B60H 1/00278
165/202
7,789,176 B2* 9/2010 Zhou .................. B60H 1/00278
180/65.1
2020/0198443 A1* 6/2020 Kato .................. B60H 1/00278

* cited by examiner

*Primary Examiner* — Tho V Duong
(74) *Attorney, Agent, or Firm* — Norton Rose Fulbright US LLP; James R. Crawford

(57) ABSTRACT

A vehicular heat management system includes a refrigerant circulation line configured to generate hot energy or cold energy depending on a flow direction of a refrigerant, a heater core side coolant circulation line configured to transfer refrigerant heat generated in the refrigerant circulation line to a heater core to heat a passenger compartment, and a battery side coolant circulation line configured to receive coolant heat of the heater core side coolant circulation line via a coolant and then circulate the coolant through a battery to preheat the battery.

8 Claims, 6 Drawing Sheets

VEHICULAR HEAT MANAGEMENT SYSTEM

CROSS-REFERENCE TO RELATED PATENT APPLICATIONS

This application claims the benefit of Korean Patent Application No. 10-2018-0101750 dated Aug. 29, 2018 and 10-2019-0103505 dated Aug. 23, 2019. The disclosure of the above patent application is hereby incorporated herein by reference in their entirety.

TECHNICAL FIELD

The present invention relates to a vehicular heat management system and, more particularly, to a vehicular heat management system capable of improving a battery preheating structure to prevent a battery from being excessively preheated and to prevent performance degradation, damage and lifespan reduction of the battery due to the excessive preheating of the battery.

BACKGROUND ART

A hybrid vehicle, an electric vehicle or the like (hereinafter referred to as "vehicle") is provided with electric motors, various electric devices and a high capacity battery.

In particular, the battery is rechargeable and supplies electricity to the electric motors and various electric devices of the vehicle, thereby enabling the vehicle to travel.

Such a battery is greatly influenced by a temperature. In particular, when the temperature of an ambient air is low, such as in winter, the temperature of the battery is lowered, thereby reducing the charging and discharging efficiency. Furthermore, the capacity and output of the battery are reduced, significantly reducing the travel performance and travel distance of the vehicle. In worst cases, it may be difficult to start up the vehicle.

Therefore, it is important to preheat the battery to a predetermined temperature or more in order to prevent the reduction of the charging and discharging efficiency of the battery and the reduction of the capacity and output of the battery. To this end, as shown in FIG. 1, the vehicle is provided with a battery preheater 10.

The battery preheater 10 uses a refrigerant of an air conditioner 20 and includes a bypass valve 12 for bypassing a high temperature coolant of a heater core side coolant circulation line 30 introduced into a heater core 22 of the air conditioner 20, and a bypass line 14 for circulating the high temperature coolant bypassed by the bypass valve 12 through a battery 40 and then returning the high temperature coolant to the heater core side coolant circulation line 30.

The battery preheater 10 bypasses the high temperature coolant of the heater core side coolant circulation line 30 introduced into the heater core 22 of the air conditioner 20 and then circulates the high temperature coolant through the battery 40, thereby preheating the battery 40.

This enables the battery 40 to maintain a constant temperature. Thus, even when the ambient temperature is low in winter, the battery can maintain constant performance in the charging/discharging efficiency, the capacity and the output of the battery.

The air conditioner 20 is a heat pump type and includes a refrigerant circulation line 24 and a heater core side coolant circulation line 30.

In particular, the heater core side coolant circulation line 30 includes a water-cooled first heat exchanger 32 for receiving the heat of a refrigerant in the refrigerant circulation line 24, a PTC heater 34 for heating coolant by the electricity applied thereto, and a water pump for circulating the coolant between the first heat exchanger 32, the PTC heater 34 and the heater core 22.

The water pump 36 causes at least one of the coolant on the side of the first heat exchanger 32 that has received the refrigerant heat from the refrigerant circulation line 24 and the coolant heated by the PTC heater 34 to circulate through the heater core 22. Therefore, the heater core 22 can heat a passenger compartment while discharging the coolant heat into the passenger compartment.

Since the conventional battery preheater 10 is configured to directly bypass the high temperature coolant of the heater core side coolant circulation line 30 to directly preheat the battery 40, the preheating of the battery 40 may be excessive.

In particular, when the temperature of the coolant in the heater core side coolant circulation line 30 is high, the battery 40 may be excessively preheated by the coolant. In this case, the battery 40 is overheated, which may lead to degradation of the performance of the battery 40, the reduction of the lifespan of the battery 40 and the damage of the battery 40.

In addition, the conventional battery preheater 10 is configured to preheat the battery 40 by bypassing the high temperature coolant of the heater core side coolant circulation line 30 without considering the temperature of the battery 40. Therefore, the battery 40 may be excessively preheated by the high temperature coolant.

Due to such disadvantages, the battery 40 is overheated, which may lead to degradation of the performance of the battery 40, the reduction of the lifespan of the battery 40 and the damage of the battery 40.

SUMMARY

In view of the aforementioned problems inherent in the related art, it is an object of the present invention to provide a vehicular heat management system capable of improving a battery preheating structure to prevent a battery from being overheated.

Another object of the present invention is to provide a vehicular heat management system capable of preventing excessive preheating of a battery to prevent the overheating of the battery, the degradation in the performance of the battery, the damage of the battery and the reduction in the lifespan of the battery.

A further object of the present invention is to provide a vehicular heat management system capable of variably controlling a preheating degree of a battery according to the need to prevent the overheating of the battery, the degradation in the performance of the battery, the damage of the battery and the reduction in the lifespan of the battery.

According to one aspect of the present invention, there is provided a vehicular heat management system, including: a refrigerant circulation line configured to generate hot energy or cold energy depending on a flow direction of a refrigerant; a heater core side coolant circulation line configured to transfer refrigerant heat generated in the refrigerant circulation line to a heater core to heat a passenger compartment; and a battery side coolant circulation line configured to receive coolant heat of the heater core side coolant circulation line via a coolant and then circulate the coolant through a battery to preheat the battery.

In the system, the battery side coolant circulation line may include a second heat exchanger configured to receive the coolant heat of the heater core side coolant circulation line, and a water pump configured to circulate the coolant between the second heat exchanger and the battery and introduce the coolant in the second heat exchanger, which has received the coolant heat of the heater core side coolant circulation line, toward the battery.

The system may further include: a controller configured to variably control a rotational speed of the water pump of the battery side coolant circulation line depending on a temperature of the coolant of the battery side coolant circulation line.

In the system, the controller may be configured to turn off the water pump of the battery side coolant circulation line when the temperature of the coolant of the battery side coolant circulation line exceeds a predetermined reference coolant temperature.

In the system, the controller may be configured to turn on the water pump of the battery side coolant circulation line when the temperature of the coolant of the battery side coolant circulation line is lowered to the predetermined reference coolant temperature or less.

According to the present vehicular heat management system, the heat of the coolant of the heater core side coolant circulation line is transferred to the coolant of the battery side coolant circulation line to preheat the battery. Therefore, unlike the related art in which the battery is directly preheated by the heat of the coolant of the heater core side coolant circulation line, it is possible to indirectly preheat the battery.

Furthermore, since the battery can be indirectly preheated, it is possible to prevent the battery from being overheated due to the direct preheating of the battery. This makes it possible to prevent the degradation in the performance of the battery, the damage of the battery and the reduction in the lifespan of the battery.

Moreover, it is possible to control the flow rate of the coolant circulated through the battery by variably controlling the water pump of the battery side coolant circulation line according to the temperature of the coolant. Therefore, it is possible to prevent the excessive preheating of the battery due to the coolant temperature and the resultant overheating of the battery.

Since the overheating of the battery can be prevented, it is possible to prevent the degradation in the performance of the battery, the damage of the battery and the reduction in the lifespan of the battery.

DETAILED DESCRIPTION

Figure 1:
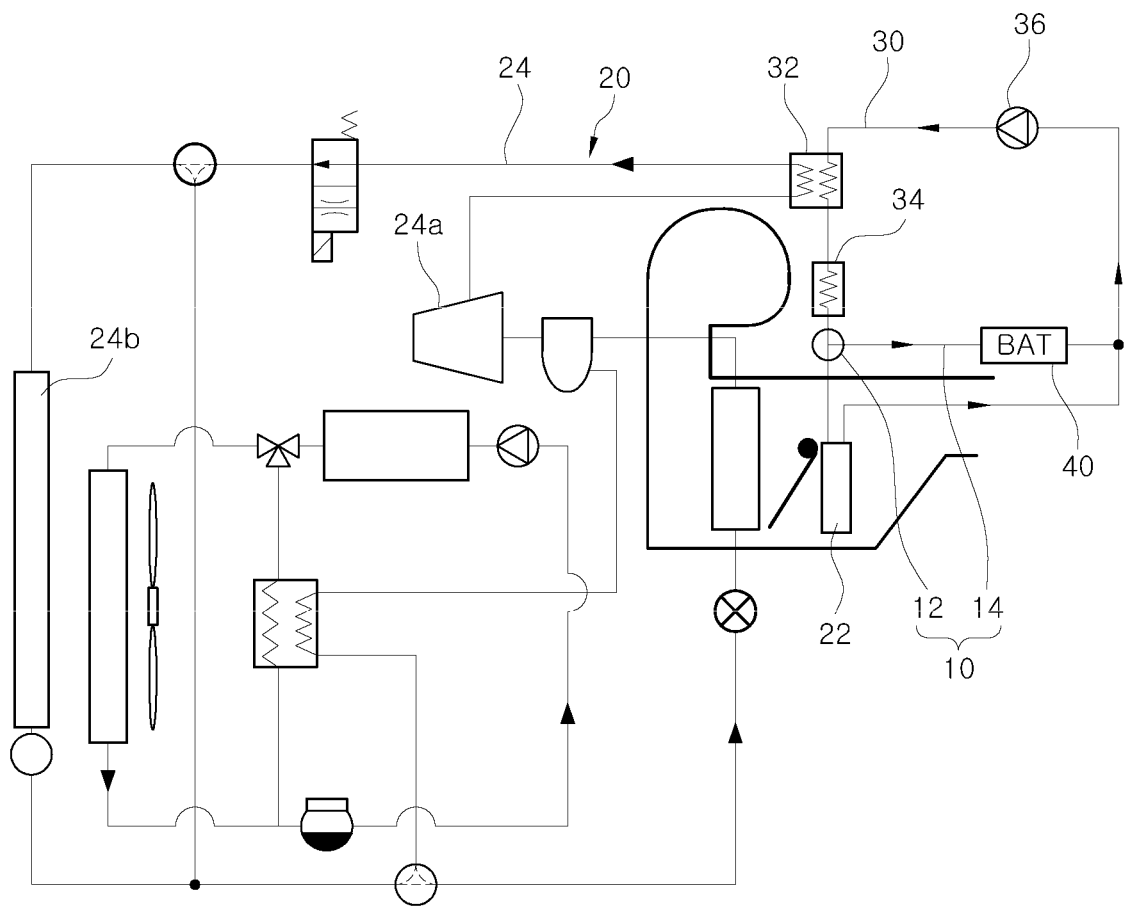
FIG. 1 is a detailed view of a conventional vehicular heat management system.

A preferred embodiment of a vehicular heat management system according to the present invention will now be described in detail with reference to the accompanying drawings.

Prior to describing the characteristic parts of a vehicular heat management system according to the present invention, an air conditioner 20 for cooling or heating a passenger compartment will be briefly described with reference to FIG. 2.

The air conditioner 20 is a heat pump type and includes a refrigerant circulation line 24 and a heater core side coolant circulation line 30.

In particular, the heater core side coolant circulation line 30 transfers the refrigerant heat generated on the side of a compressor 24a of a refrigerant circulation line 24 to a heater core 22, and includes a water-cooled first heat exchanger 32 configured to receive the refrigerant heat of the refrigerant circulation line 24, a PTC heater 34 configured to heat coolant by the electricity applied thereto and a water pump 36 configured to circulate the coolant between the first heat exchanger 32, the PTC heater 34 and the heater core 22.

The heater core side coolant circulation line 30 receives the coolant heat generated on the side of the compressor 24a of the coolant circulation line 24 through the coolant and circulates the high temperature coolant through the heater core 22. Therefore, the heater core 22 discharges the coolant heat into a passenger compartment, thereby making it possible to heat the passenger compartment.

Next, the features of the vehicular heat management system according to the present invention will be described in detail with reference to FIGS. 2 and 3.

Figure 2:
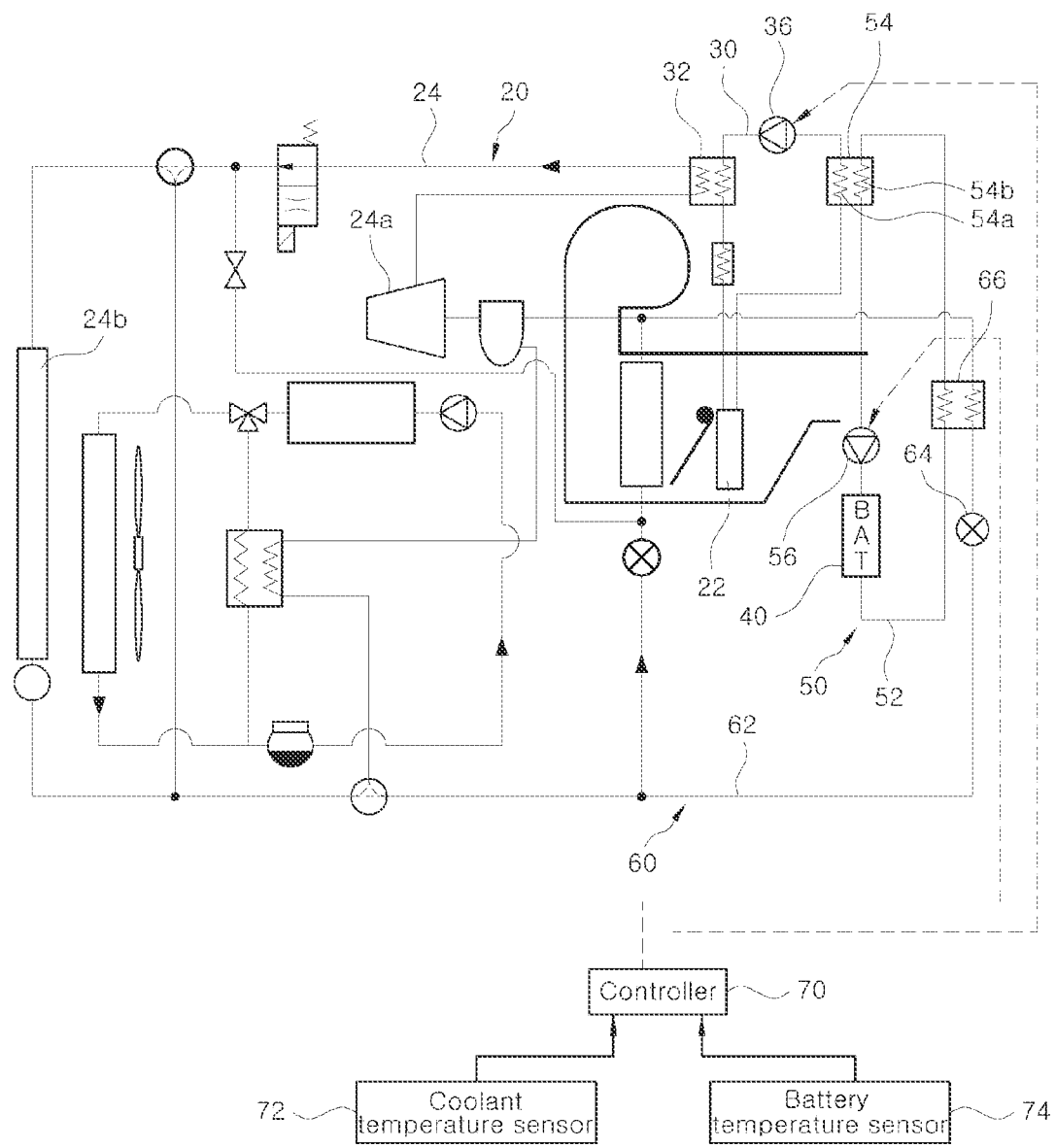
FIG. 2 is a detailed view showing a vehicular heat management system according to the present invention.

Referring first to FIG. 2, the heat management system of the present invention includes a battery preheater 50. The battery preheater 50 is configured to preheat a battery 40 using the coolant heat of the heater core side coolant circulation line 30. The battery preheater 50 includes a battery side coolant circulation line 52.

The battery side coolant circulation line 52 is configured to transfer the coolant heat of the heater core side coolant circulation line 30 to the battery 40. The battery side coolant circulation line 52 includes a water-cooled second heat exchanger 54 configured to receive the coolant heat of the heater core side coolant circulation line 30 and a water pump 56 configured to circulate the coolant between the second heat exchanger 54 and the battery 40.

The second heat exchanger 54 includes a first coolant flow path 54a through which the coolant of the heater core side coolant circulation line 30 is circulated, and a second coolant flow path 54b through which the coolant of the battery side coolant circulation line 52 is circulated.

The first and second coolant flow paths 54a and 54b are formed to correspond to each other so as to allow the coolant of the heater core side coolant circulation line 30 and the coolant of the battery side coolant circulation line 52 to exchange heat with each other.

Figure 3:
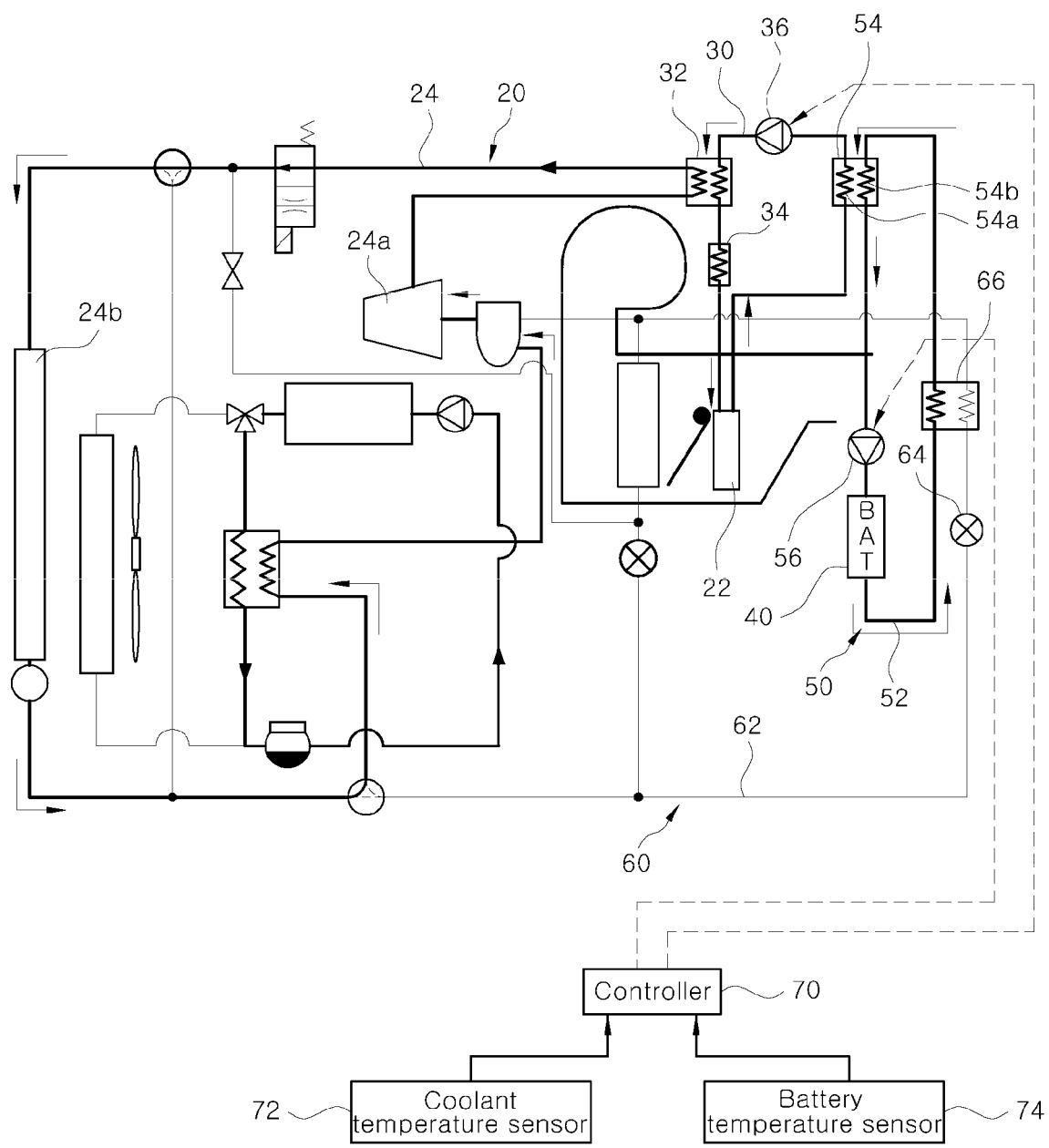
FIG. 3 is a view showing an operation example of the vehicular heat management system according to the present invention, in which the battery is preheated in a passenger compartment heating mode.

In particular, as shown in FIG. 3, in a passenger compartment heating mode, the coolant of the heater core side coolant circulation line 30 and the coolant of the battery side coolant circulation line 52 are allowed to exchange heat with each other.

Therefore, in the passenger compartment heating mode, the coolant heat of the heater core side coolant circulation line 30 is transferred to the coolant of the battery side coolant circulation line 52, and the heat-transferred coolant is circulated through the battery 40 to preheat the battery 40.

Figure 4:
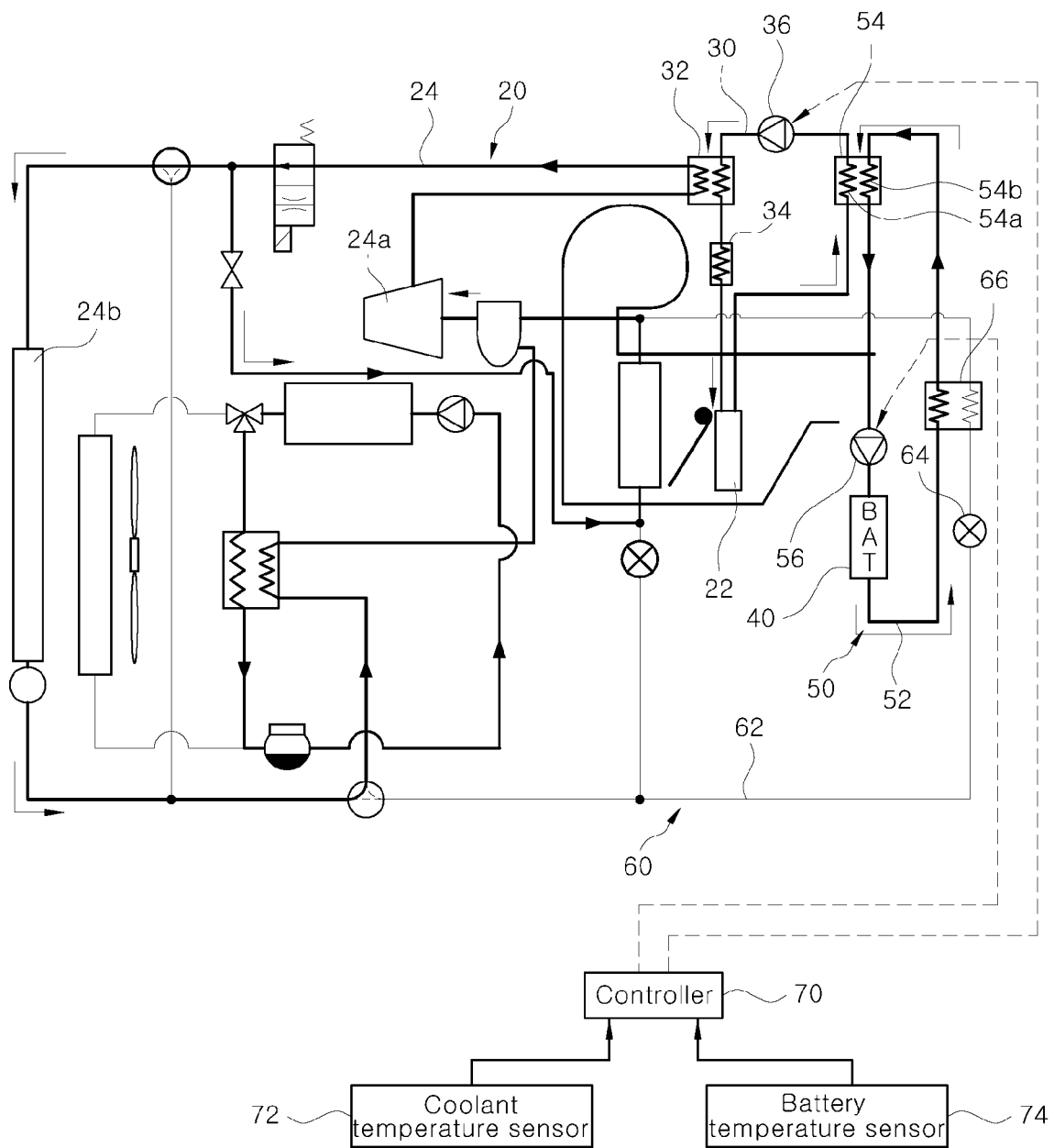
FIG. 4 is a view showing an operation example of the vehicular heat management system according to the present invention, in which the battery is preheated in a passenger compartment dehumidifying mode.

Furthermore, as shown in FIG. 4, in a passenger compartment dehumidifying mode, the first and second coolant flow paths 54a and 54b allow the coolant of the heater core side coolant circulation line 30 and the coolant of the battery side coolant circulation line 52 to exchange heat with each other.

Therefore, in the passenger compartment dehumidifying mode, the coolant heat of the heater core side coolant circulation line 30 is transferred to the coolant of the battery side coolant circulation line 52, and the heat-transferred coolant is circulated through the battery 40 to preheat the battery 40.

Figure 5:
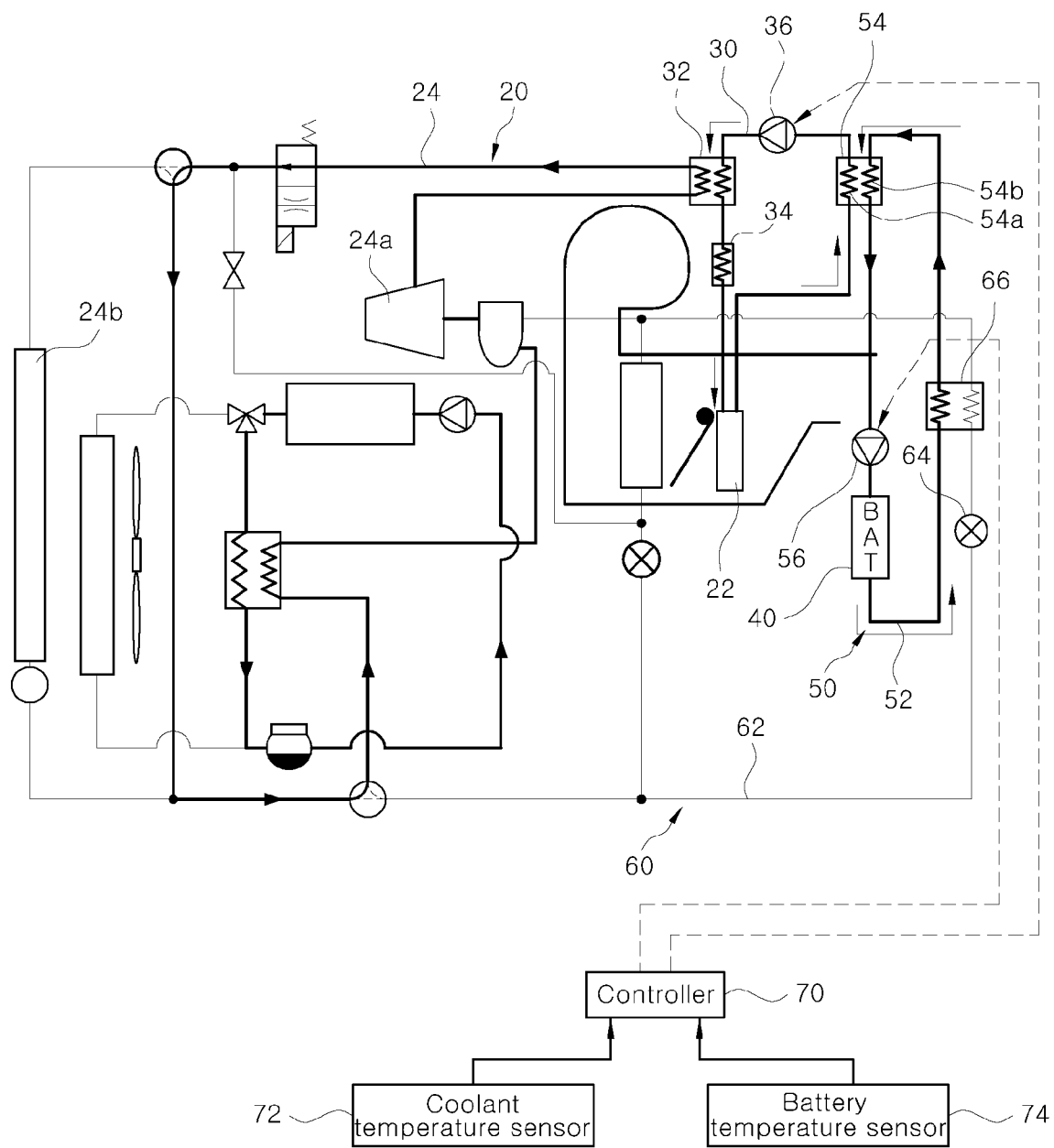
FIG. 5 is a view showing an operation example of the vehicular heat management system according to the present invention, in which the battery is preheated in an outdoor heat exchanger defrosting mode.

In addition, as shown in FIG. 5, in a defrosting mode for an outdoor heat exchanger 24b, the first and second coolant flow paths 54a and 54b allow the coolant of the heater core side coolant circulation line 30 and the coolant of the battery side coolant circulation line 52 to exchange heat with each other.

Therefore, in the defrosting mode for the outdoor heat exchanger 24b, the coolant heat of the heater core side coolant circulation line 30 is transferred to the coolant of the battery side coolant circulation line 52, and the heat-transferred coolant is circulated through the battery 40 to preheat the battery 40.

As described above, the battery side coolant circulation line 52 receives the coolant heat of the heater core side coolant circulation line 30 to preheat the battery 40. Therefore, unlike the conventional structure in which the battery 40 is directly preheated by the coolant heat of the heater core side coolant circulation line 30, it is possible to indirectly preheat the battery 40.

Therefore, it is possible to prevent the overheating of the battery 40 which may occur when the high temperature coolant of the heater core side coolant circulation line 30 directly preheats the battery 40. As a result, it is possible to prevent the degradation in the performance of the battery 40, the damage of the battery 40 and the reduction in the lifespan of the battery 40.

In this regard, the battery side coolant circulation line 52 may be a battery side coolant circulation line for an existing battery cooler 60 installed to cool the battery 40.

Therefore, the battery 40 can be preheated without installing a separate coolant circulation line. This makes it possible to expect a cost reduction effect.

The battery cooler 60 uses the refrigerant of the air conditioner 20, and includes a bypass flow path 62 configured to bypass the refrigerant of the air conditioner 20, an expansion valve 64 configured to expand and depressurize the refrigerant of the bypass flow path 62, a third heat exchanger 66 configured to generate cold energy using the expanded/depressurized refrigerant, and a battery side coolant circulation line 52 configured to transfer the cold energy generated in the third heat exchanger 66 to the battery 40.

Figure 6:
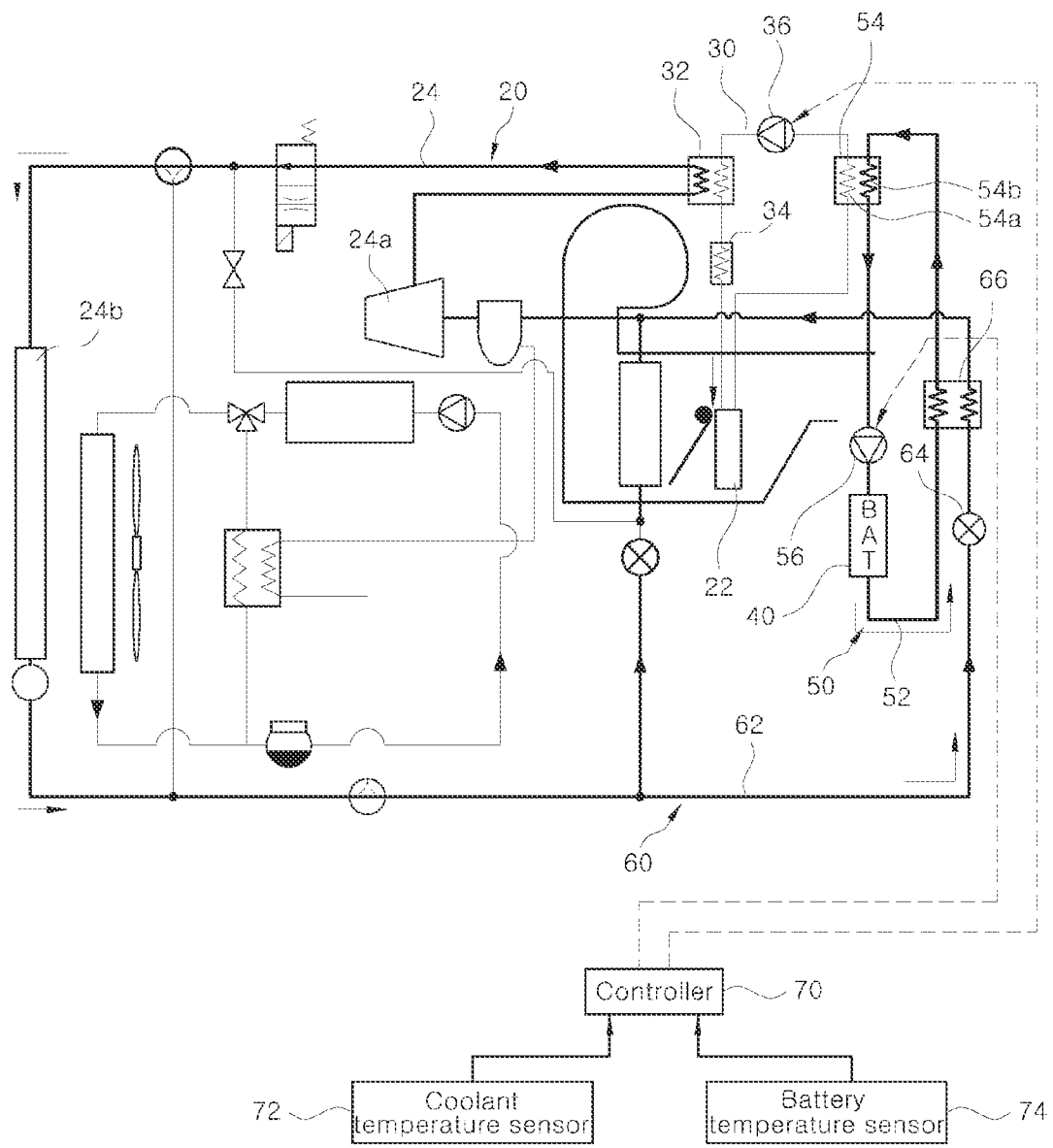
FIG. 6 is a view showing an operation example of the vehicular heat management system according to the present invention, in which the battery is cooled in a passenger compartment cooling mode.

In particular, as shown in FIG. 6, in a passenger compartment cooling mode, the third heat exchanger 66 causes the refrigerant of the refrigerant circulation line 24 and the coolant of the battery side coolant circulation line 52 to exchange heat with each other. The third heat exchanger 66 transfers the cold energy generated in the refrigerant circulation line 24 to the coolant of the battery side coolant circulation line 52.

Therefore, the coolant of the battery side coolant circulation line 52 which has received the cool energy of the refrigerant circulation line 24 is circulated through the battery 40 to cool the battery 40.

Referring again to FIG. 2, the battery preheater 50 further includes a controller 70.

The controller 70 is equipped with a microprocessor and is configured to variably control at least one of the water pump 36 of the heater core side coolant circulation line 30 and the water pump 56 of the battery side coolant circulation line 52 depending on the coolant temperature or the battery temperature inputted from a coolant temperature sensor 72 or a battery temperature sensor 74.

In particular, when the coolant temperature of the battery side coolant circulation line 52 inputted from the coolant temperature sensor 72 exceeds a predetermined reference coolant temperature, the controller 70 turns off the water pump 56 of the battery side coolant circulation line 52.

Accordingly, it is possible to prevent the coolant having an excessively high temperature from circulating through the battery 40. This makes it possible prevent the battery 40 from being overheated by the coolant having an excessively high temperature.

When the coolant temperature of the battery side coolant circulation line 52 inputted from the coolant temperature sensor 72 is lowered to the reference coolant temperature or less, the controller 70 turns on the water pump 56 of the battery side coolant circulation line 52 again. This makes it possible to resume the preheating of the battery 40.

On the other hand, when the temperature of the battery 40 inputted from the battery temperature sensor 74 exceeds the predetermined reference battery temperature, the controller 70 turns off the water pump 56 of the battery side coolant circulation line 52.

Thus, when the temperature of the battery 40 exceeds the reference battery temperature, the controller 70 prevents the battery 40 from being preheated. This makes it possible to prevent the battery 40 from being overheated due to the preheating of the battery 40.

When the temperature of the battery 40 inputted from the battery temperature sensor 74 is lowered to the reference battery temperature or less, the controller 70 turns on the water pump 56 of the battery side coolant circulation line 52 again. Th makes it possible to resume the preheating of the battery 40.

Meanwhile, the controller 70 may actively variably control the water pump 56 of the battery side coolant circulation line 52 in proportion to the coolant temperature or the battery temperature inputted from the coolant temperature sensor 72 or the battery temperature sensor 74.

The coolant temperature sensor 72 is provided on the battery side coolant circulation line 52. It is preferable to install the coolant temperature sensor 72 in the battery side coolant circulation line 52 on the upstream side of the battery 40. This is to detect the temperature of the coolant introduced toward the battery 40.

According to the thermal management system of the present invention having such a structure, the coolant heat of the heater core side coolant circulation line 30 is transferred to the coolant of the battery side coolant circulation line 52 and then the battery 40 is preheated by the heat of the coolant. Because of the preheating structure, unlike the prior art that directly preheats the battery 40 by the coolant heat of the heater core side coolant circulation line 30, it is possible to indirectly preheat the battery 40.

According to the present vehicular heat management system having such a structure, the heat of the coolant of the heater core side coolant circulation line 30 is transferred to the coolant of the battery side coolant circulation line 52 to preheat the battery 40. Therefore, unlike the related art in which the battery 40 is directly preheated by the heat of the coolant of the heater core side coolant circulation line 30, it is possible to indirectly preheat the battery 40.

Furthermore, since the battery 40 can be indirectly preheated, it is possible to prevent the battery from being overheated due to the direct preheating of the battery 40. This makes it possible to prevent the degradation in the performance of the battery 40, the damage of the battery 40 and the reduction in the lifespan of the battery 40.

Moreover, it is possible to control the flow rate of the coolant circulated through the battery 40 by variably controlling the water pump 56 of the battery side coolant circulation line 52 according to the temperature of the coolant. Therefore, it is possible to prevent the excessive preheating of the battery 40 due to the coolant temperature and the resultant overheating of the battery 40.

Since the overheating of the battery 40 can be prevented, it is possible to prevent the degradation in the performance of the battery 40, the damage of the battery 40 and the reduction in the lifespan of the battery 40.

While the preferred embodiment of the present invention has been described above, the present invention is not limited to the above-described embodiment. Various modifications and changes may be made without departing from the scope and spirit of the present invention defined in the claims.

What is claimed is:

1. A vehicular heat management system, comprising:
   a refrigerant circulation line configured to generate hot energy or cold energy depending on a flow direction of a refrigerant;
   a heater core side coolant circulation line configured to transfer refrigerant heat generated on the side of a compressor of a refrigerant circulation line to a heater core to heat a passenger compartment;
   a battery side coolant circulation line configured to receive coolant heat of the heater core side coolant circulation line via a coolant and then circulate the coolant through a battery to preheat the battery; and
   wherein the system preheats the battery to a predetermined temperature or more in order to prevent the reduction of the charging and discharging efficiency of the battery and the reduction of the capacity and output of the battery;
   wherein the battery side coolant circulation line includes a second heat exchanger configured to receive the coolant heat of the heater core side coolant circulation line, and a water pump configured to circulate the coolant between the second heat exchanger and the battery and introduce the coolant in the second heat exchanger, which has received the coolant heat of the heater core side coolant circulation line, toward the battery,
   wherein the heat of the coolant of the heater core side coolant circulation line is transferred to the coolant of the battery side coolant circulation line to preheat the battery, and
   wherein the battery is indirectly preheated by the heat of the coolant of the heater core side coolant circulation line, and
   wherein the system further comprises:
   a controller configured to variably control a rotational speed of the water pump of the battery side coolant circulation line depending on a temperature of the coolant of the battery side coolant circulation line, and
   wherein the controller is configured to turn off the water pump of the battery side coolant circulation line when the temperature of the coolant of the battery side coolant circulation line exceeds a predetermined reference coolant temperature.

2. The system of claim 1, wherein the controller is configured to turn on the water pump of the battery side coolant circulation line when the temperature of the coolant of the battery side coolant circulation line is lowered to the predetermined reference coolant temperature or less.

3. The system of claim 2, wherein the controller is configured to variably control the rotational speed of the water pump of the battery side coolant circulation line depending on a temperature of the battery.

4. The system of claim 3, wherein the controller is configured to turn off the water pump of the battery side coolant circulation line when the temperature of the battery exceeds a predetermined reference battery temperature.

5. The system of claim 4, wherein the controller is configured to turn on the water pump of the battery side coolant circulation line when the temperature of the battery is lowered to the predetermined reference battery temperature or less.

6. The system of claim 1, wherein the controller is configured to variably control the rotational speed of the water pump of the battery side coolant circulation line in proportion to the temperature of the coolant of the battery side coolant circulation line.

7. The system of claim 3, wherein the controller is configured to variably control the rotational speed of the water pump of the battery side coolant circulation line in proportion to the temperature of the battery.

8. The system of claim 7, wherein the heater core side coolant circulation line includes a first heat exchanger configured to receive the refrigerant heat of the refrigerant circulation line and a water pump configured to circulate the coolant between the first heat exchanger and the heater core and introduce the coolant of the first heat exchanger, which has received the refrigerant heat of the refrigerant circulation line, toward the heater core, and
   the controller is configured to variably control a rotational speed of a water pump of the heater core side coolant circulation line depending on a temperature of the coolant of the battery side coolant circulation line.

* * * * *